Dec. 15, 1970     W. H. CLENDENIN     3,546,861
FORAGE HARVESTER

Original Filed Aug. 2, 1966     6 Sheets-Sheet 1

INVENTOR
WILBUR H. CLENDENIN

John J. Kowalik
ATTY.

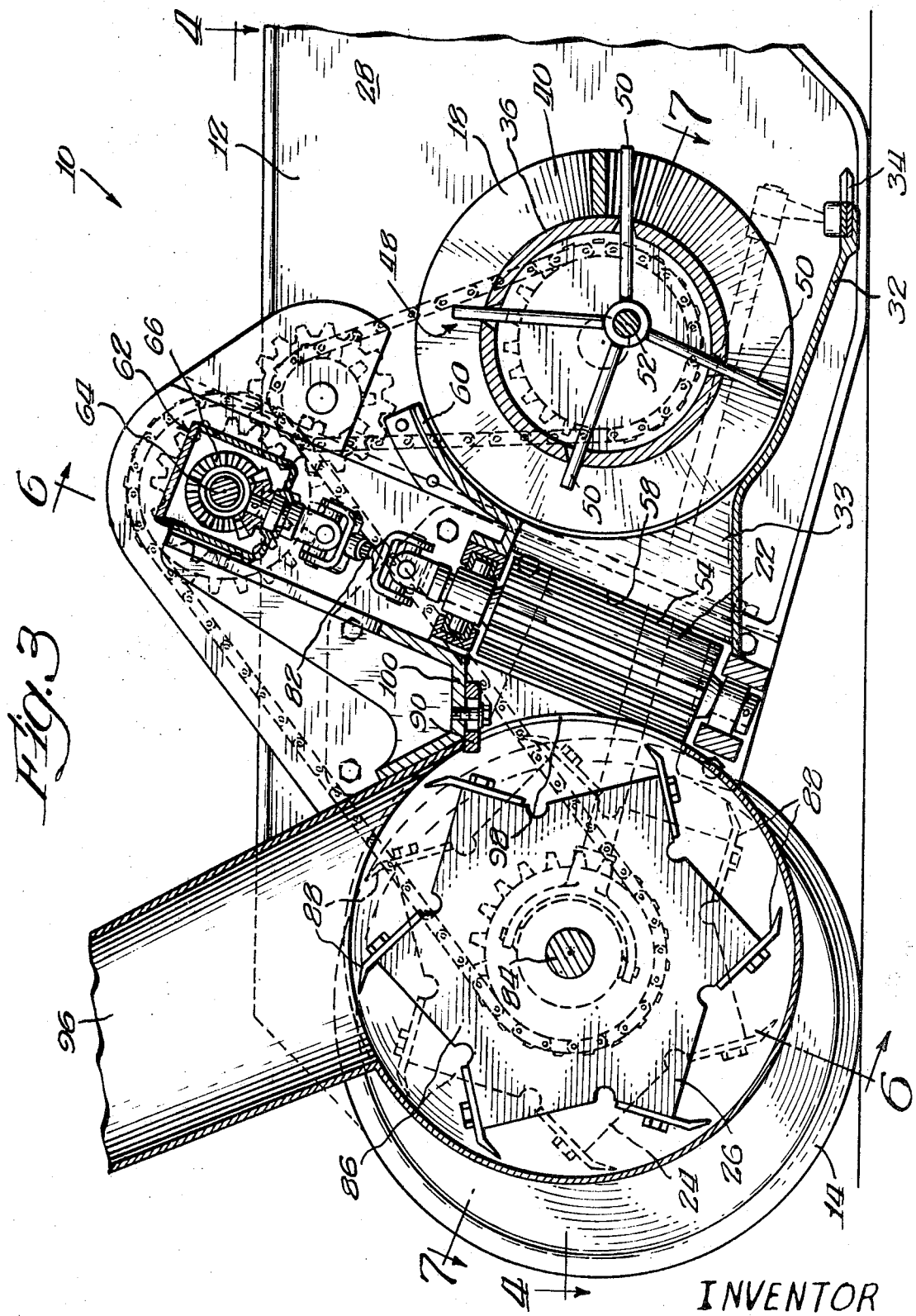

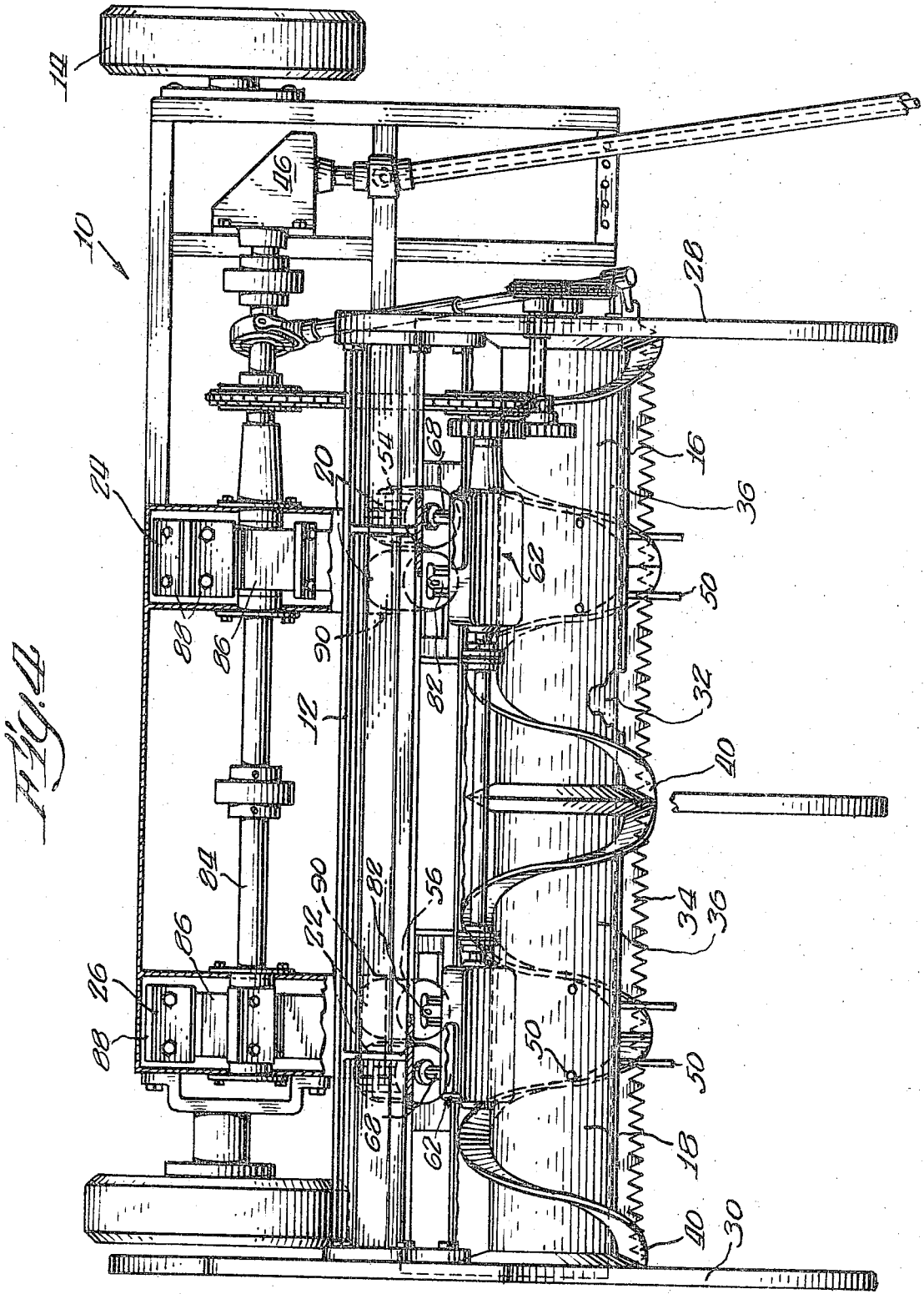

Dec. 15, 1970 W. H. CLENDENIN 3,546,861
FORAGE HARVESTER
Original Filed Aug. 2, 1966 6 Sheets-Sheet 4
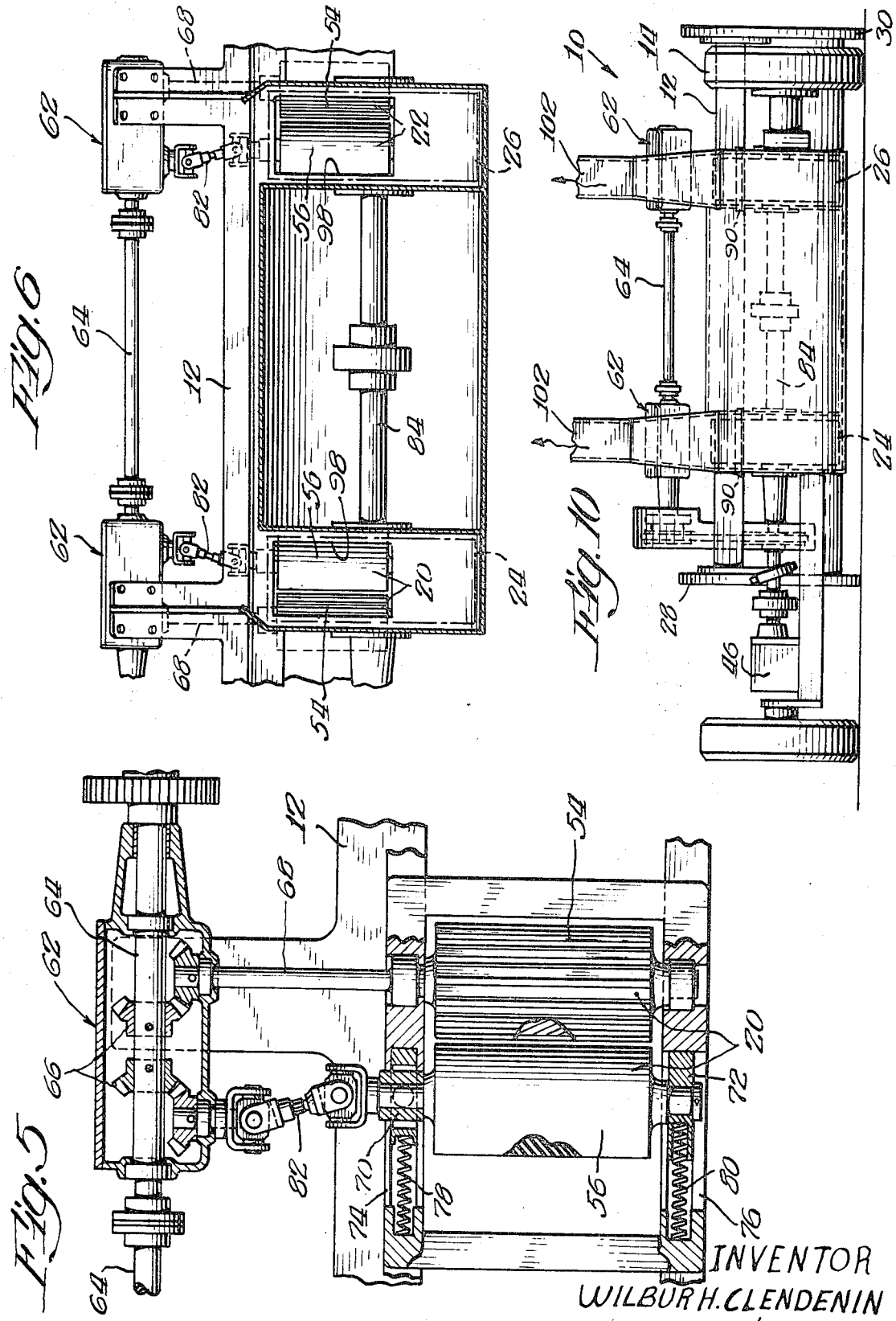
INVENTOR
WILBUR H. CLENDENIN
John J. Kowalik
ATTY.

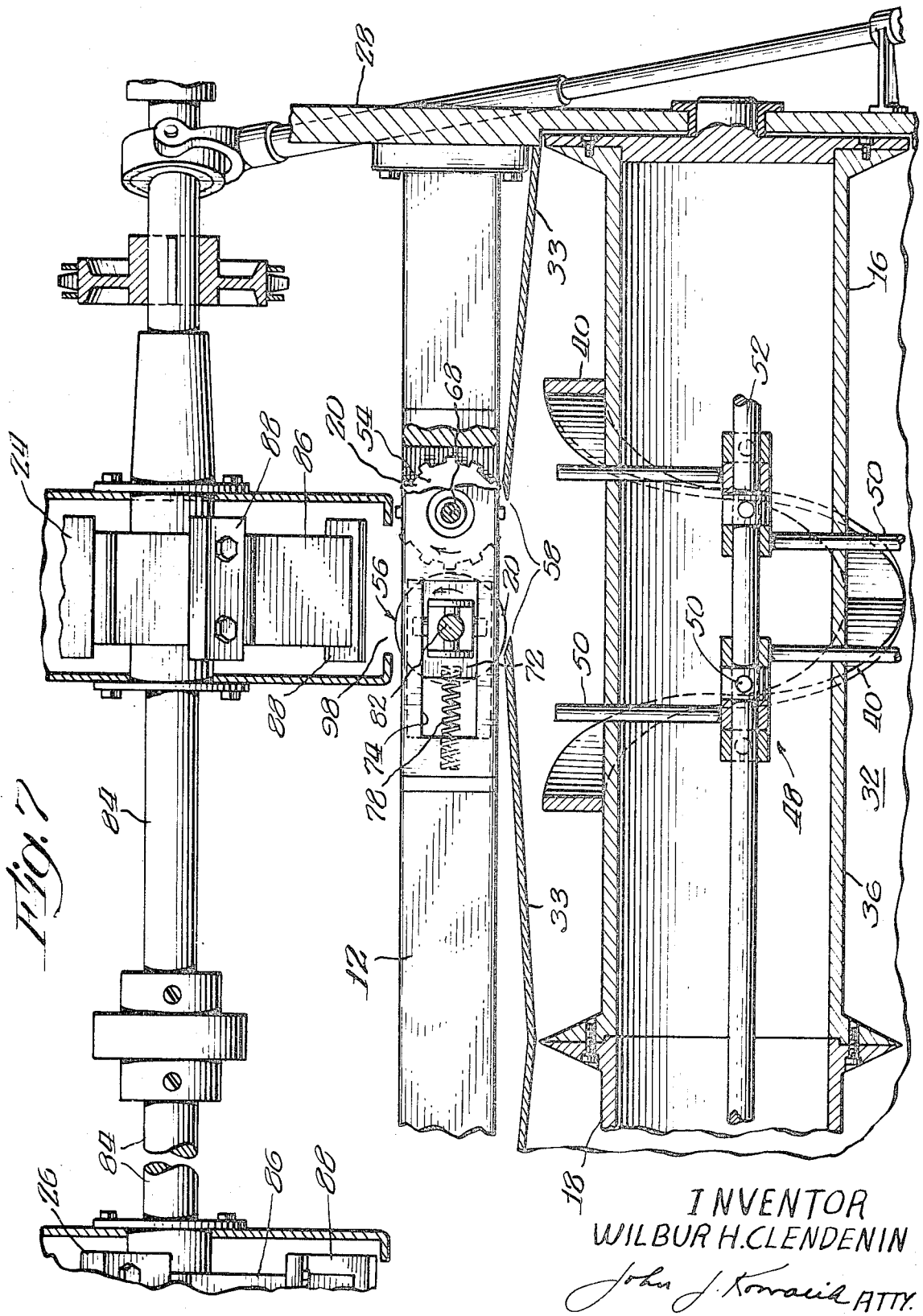

Dec. 15, 1970 W. H. CLENDENIN 3,546,861
FORAGE HARVESTER
Original Filed Aug. 2, 1966 6 Sheets-Sheet 6
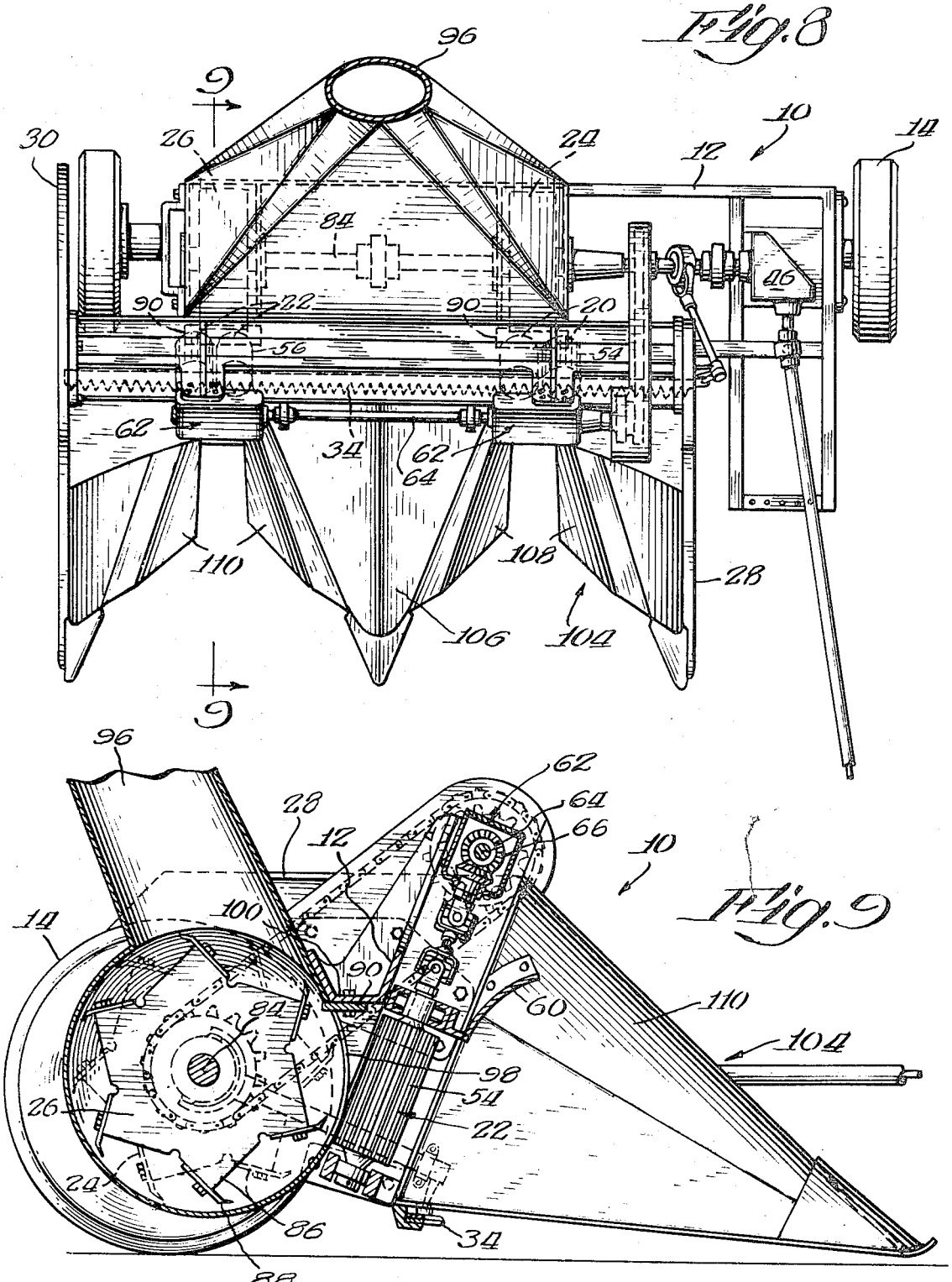
INVENTOR
WILBUR H. CLENDENIN
John J. Kowalik
ATTY.

United States Patent Office 3,546,861
Patented Dec. 15, 1970

3,546,861
FORAGE HARVESTER
Wilbur H. Clendenin, Memphis, Tenn., assignor to International Harvester Company, Chicago, Ill., a corporation of Delaware
Continuation of application Ser. No. 569,749, Aug. 2, 1966. This application May 12, 1969, Ser. No. 826,068
Int. Cl. A01d 43/06
U.S. Cl. 56—23                11 Claims

ABSTRACT OF THE DISCLOSURE

A crop harvester having a forward cutting mechanism, a conveyor behind such mechanism, a plurality of chopping and conveying assemblies spaced along the cutting and conveying mechanism, and feed chopping assemblies being interconnected by a common drive, and a cooperative roller feed mechanism for feeding crops from the conveying mechanism to the chopping assemblies.

---

This application is a continuation of my pending application Ser. No. 569,749, filed Aug. 2, 1966, entitled Forage Harvester, now abandoned.

The present invention relates to agricultural machines and more particularly to forage harvesters.

It is a general object of the present invention to provide a new and improved forage harvester which has a lighter weight, lower cost and improved operation over prior forage harvesters.

It is an object of the invention to provide a forage harvester having an improved structure for gathering, feeding and comminuting crop.

It is another object of the present invention to provide an improved forage harvester which may be used to harvest standing forage, windrow, row crop or alternate row crop and which is particularly effective for over-abundant crops.

It is a further object of the present invention to provide a forage harvester having improved crop feeding and comminuting means with a more effective and safer operation including chopper means of greatly reduced mass.

It is an additional object of the present invention to provide a forage harvester having a plurality of crop receiving entrances which can either separately or commonly harvest row crops or broadcast sown crops.

The above and other objects of the invention will become more apparent from the following specification and the drawings forming a part thereof wherein:

FIG. 3 is a cross-sectional view taken along the line 3—3 of FIG. 1;

FIG. 4 is a cross-sectional view taken along the line 4—4 of FIG. 3;

FIG. 5 is a detailed view of a feed roll pair and the drive therefor for the embodiment of FIG. 1;

FIG. 6 is a cross-sectional view taken along the line 6—6 of FIG. 3;

FIG. 7 is a cross-sectional view taken along the line 7—7 of FIG. 3;

FIG. 8 is a plan view of a further embodiment of the invention which differs from the forage harvester of FIG. 1 in that it has a row crop attachment thereon;

FIG. 9 is a cross-sectional view of the embodiment taken along the line 9—9 of FIG. 8; and FIG. 10 is a rear view of a further embodiment of the invention in which the forage harvester of FIG. 1 has dual discharge housing.

Figure 1:
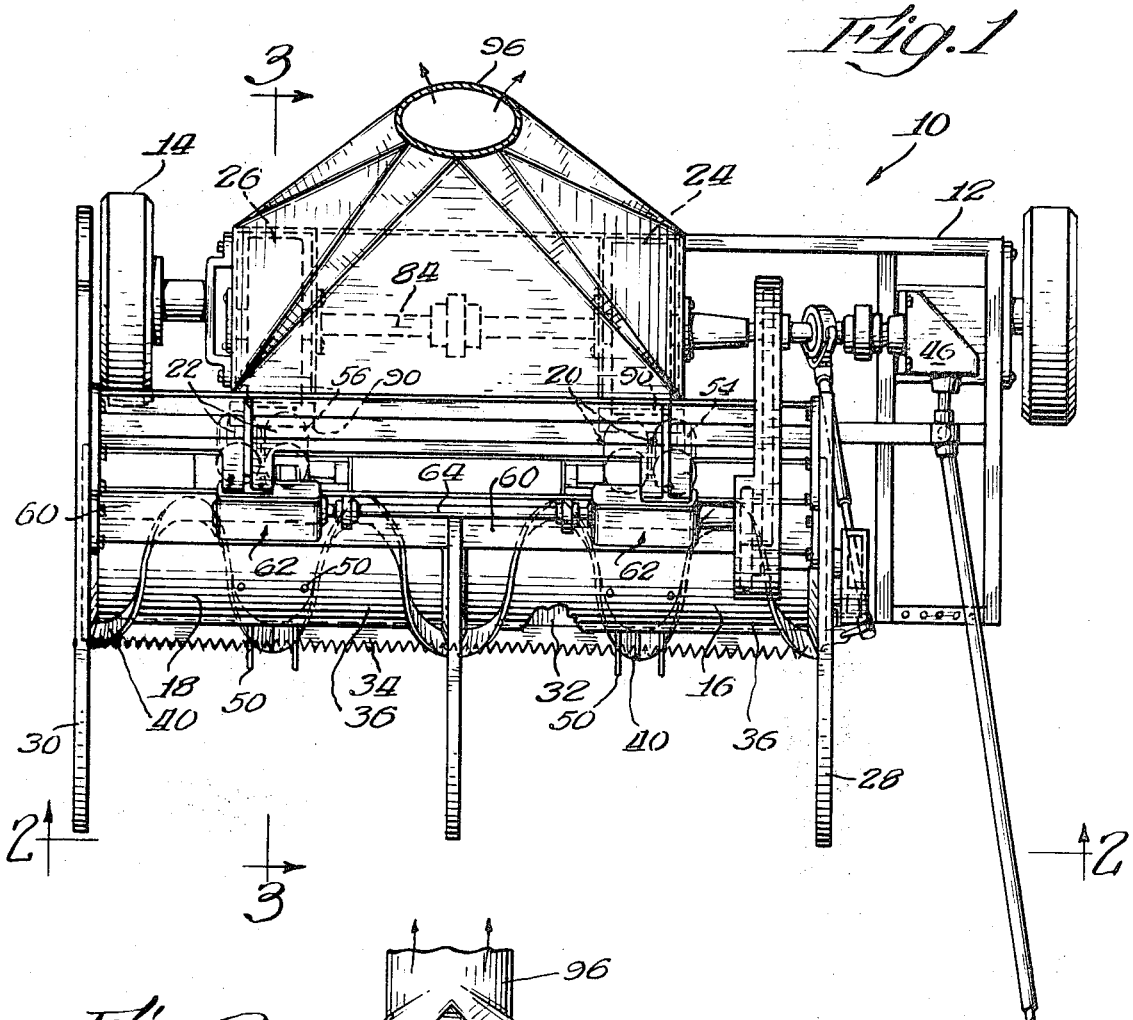
FIG. 1 is a plan view of an exemplary forage harvester in accordance with the present invention.

Referring now to the drawings, wherein like reference characters designate like and corresponding parts throughout the various views and embodiments, there is shown an exemplary forage harvester in accordance with the present invention generally designated 10. The forage harvester 10 includes a chassis or support structure 12 carried on a conventional wheel suspension arrangement 14. Preferably removably mounted on the front of the chassis 12 are two auger drums 16 and 18, each one feeding a pair of generally vertically rotatably mounted feed rolls 20 and 22. The feed roll pairs 20 and 22 in turn each feed crop through separate and transversely spaced forwardly directed crop receiving openings into separate rotary choppers 24 and 26, which choppers comminute and throw the crop upwardly through a discharge housing. Each cooperating set of an auger drum, a feed roll pair and a chopper forms one forage harvesting unit capable of harvesting crop separately from the other such unit, although interrelated and structurally integral therewith.

The chassis 12 includes an inner side wall 28 and an outer side wall 30 and a bottom wall or ground pan 32 extending therebetween and positioned closely spaced above the field to be harvested. A generally vertical rear wall 33 is behind the auger drums. It may be seen that the chassis 12 extends transversely to the direction of movement of the forage harvester 10 over a field. The structural details of the chassis and the wheel suspension arrangement 14 are preferably generally conventional and will be obvious to those skilled in the art. Such details are shown, for example, in Pat. No. 3,139,717 issued July 7, 1964.

A conventional sickle mower 34 is preferably mounted extending substantially along the entire lower forward edge of the bottom wall 32. The sickle mower 34 may be conventionally driven by a wobble drive as is illustrated herein or other suitable mower drive mechanisms.

Considering now the means for engaging and transversely condensing the crop cut by the sickle mower 34, this is preferably accomplished solely by the inner auger drum 16 and the outer auger drum 18. The two auger drums 16 and 18 are preferably substantially identical hollow cylindrical drums fastened together in line and coaxially mounted. The two auger drums together extend transversely across the forage harvester between the side walls 28 and 30 and together are substantially coextensive in length with the sickle mower 34.

Considering one of the auger drums 16 in detail, since the other auger drum 18 is substantially identical, it may be seen that the auger drum 16 has a cylindrical base surface 36 from which evenly axially proects an auger flight or screw 40. The auger flight 40 transversely converges centrally on the auger drum. That is, the auger flight 40 has opposing pitch auger flights occupying opposite halves of the auger drum which converge at the center of the auger. The auger flight 40 thus moves all material gathered across the width of the auger drum 16 toward its center as it rotates. The auger flight 40 coperates with the chassis 12 to accomplish this movement of material by the spacing of the auger drum 16 closely above the bottom wall 32 and substantially closely from the rear wall 33.

Both auger drums 16 and 18 are preferably commonly driven from the inside end by a generally conventional chain drive arrangement from a conventional power take-off drive 46. The drive trains are arranged such that the direction of rotation of the auger drum is such that the direction of motion of the lower half of the auger drums is from front to rear of the forage harvester, thus moving the crop from the region of the sickle mower 34 rearwardly the feed roll pairs 20 and 22.

As may be seen in FIG. 3, for example, to assist the auger flights 40 in the movement of the crop, there is preferably additionally provided a retractable finger arrangement 48 for each auger drum, including a plurality of rods or fingers 50, each independently freely rotatably mounted at one end to a shaft 52. The shaft 52 is preferably located parallel to, but in front of, the common axis of rotation of the auger drums. The free ends of each finger 50 project outwardly through apertures in the cylindrical base surface of the auger drums between the auger flights 40. Thus rotation of the auger drums rotates the fingers. The eccentric mounting of the fingers with respect to the auger drums causes the free ends of the fingers to sequentially project and retract from the auger drums as the auger drums rotate. The fingers 50 are substantially fully retracted at the rearwardly facing surface of the auger drums.

Considering now the feed roll pairs 20 and 22, it may be seen that each feed roll pair is a conveying means conveying crop directly from one auger drum to the respective chopper 24 or 26 immediately behind it. Each feed roll pair is fed solely by one auger drum. Preferably the two feed roll pairs are substantially identical, and accordingly only the inside feed roll pair 20 need be described in detail herein. The feed roll pair 20 comprises an inside feed roll 54 and a substantially identical and matching outside feed roll 56. It will be noted that both of the feed rolls 54 and 56 are rotatably mounted about a generally vertical axis of rotation. Thus, the axes of the feed rolls are substantially transverse the axes of rotation of the choppers. Preferably, the axes of the feed rolls are tilted forward slightly from the vertical. That is, preferably, the upper ends of the feed rolls are the furthest forward portions of the feed rolls and are most closely adjacent the auger drums.

The preferred configuration of each roll is a generally vertically elongated cylinder with a diameter substantially smaller than that of either the auger drums or the choppers. The pair of feed rolls are thus elongated in an upward direction. The axial length of the feed rolls is preferably less than the diameter of the augers or choppers. The feed roll pairs are intermediately spaced between and transverse the respective auger drum and the chopper, and adjacent the lateral center of each. Each pair of feed rolls is designed to operate as a mating unit and accordingly the inside roll 54 and the outside roll 56 of each pair are mounted with normally generally parallel spaced axes of rotation and with their respective roll surfaces normally very closely and evenly spaced. A slight spacing between the roll surfaces of, for example, $1/32$ to $1/64$ inch is desired rather than direct contact so as to reduce friction and deformation of the rollers. Minor flutes or flights or other surface features may be provided on the surfaces of the rolls, and accordingly by way of illustration the feed roll pair 20 in FIG. 5 is shown with the inside roller 54 of vertically fluted steel construction and with the outside roll 56 of rubber construction. A suitable resiliency for rubber rolls is approximately 75 to 90 durometers. Deformable rubber rolls may be constructed similarly to the tire carcas material rolls now used in hay conditioners. It will be appreciated that, with feed rolls of suitable surface deformability, the feed roll lateral displacement means described hereinbelow is not essential.

It may be seen that each feed roll pair is located at the midpoint of each auger drum and thereby located at the convergence of the flights thereon so as to receive the crop urged thereforward by the auger. The curved rear wall 33 behind and closely adjacent the rear surface of both auger drums has a forwardly directed crop receiving aperture 58 overlying and corresponding in size to each feed roll pair so as to allow the movement of the crop therethrough, where it may be rollably grasped between the feed rolls, further laterally condensed and feed into a chopper.

The angular relation between the feed rolls and the auger drum results in the lower ends of the feed rolls being substantially further spaced from the auger drum than the upper ends. Thus, there is an upwardly constricting space between the feed rolls and the auger drum. Together with the upward direction of movement of the rear auger drum, this provides even feeding of the crop into the feed rolls along the entire vertical extent of the crop receiving aperture 58. It provides a more even distribution of crop along the feed roll pair than in a conventional horizontal feed roll arrangement, since in the latter arrangement the ends of the horizontal feed rolls are fed crop first and tend to grab a disproportionately large percentage of the crop in comparison to the center of the feed rolls.

The near tangency of the upper end of the feed rolls to the auger flights prevents crop from being carried past the feed rolls without being caught and thereby continuing on around with the auger drum. This may be assisted by a scraper 60 comprising a part of the chassis 12 which forwardly projects above the upper end of the feed rolls to within a short distance of the surface of revolution of the auger flights so as to strip crop therefrom.

Figure 2:
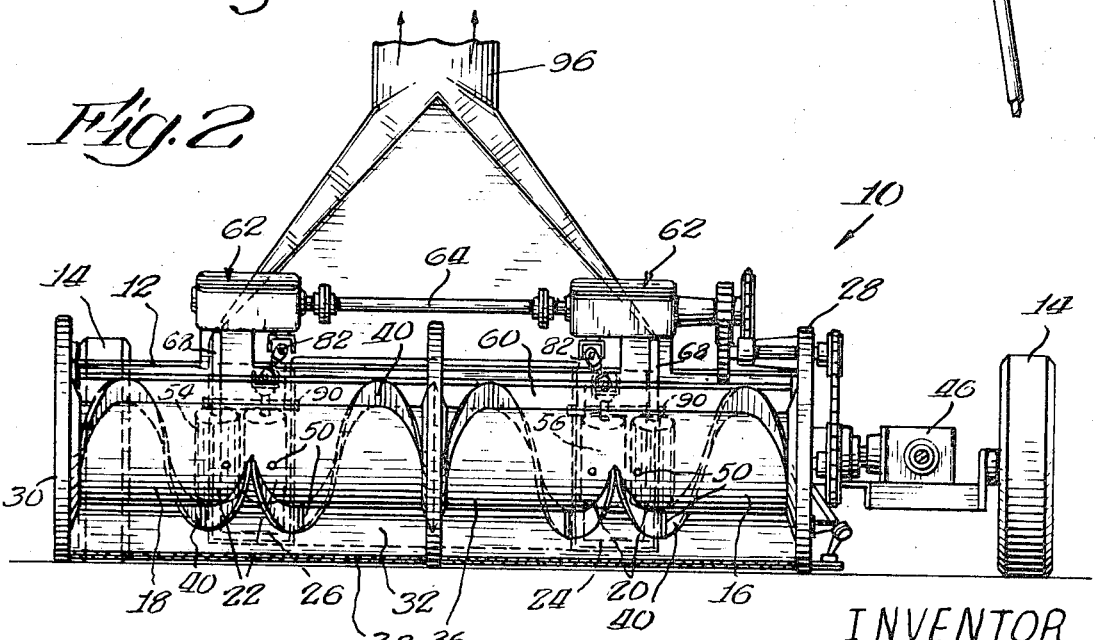
FIG. 2 is a front view of the embodiment of FIG. 1.

Referring particularly to FIGS. 2 and 5, an exemplary feed roll drive arrangement 62 is illustrated for both of the feed roll pairs 20 and 22. The drive arrangement 62 is preferably chain driven from the power take-off drive 46. A horizontal driven shaft 64 extends transversely across the machine above the feed roll pairs. Suitable conventional gearing 66 may be provided for transmitting driving power from the horizontal shaft 64 to the vertical shafts of the feed rolls. Preferably both of the feed rolls of each pair are driven, in opposite directions of rotation, with the mating or facing sides both moving rearwardly.

At least one of the feed rolls in each of the feed roll pairs is preferably laterally moveable with respect to its opposing feed roll so as to expand or contract the spacing between the rolls and allow passage of various crop sizes between the rolls. As illustrated herein merely by way of example, this may be accomplished by having the inside roll 54 fixed and driven through a fixed drive shaft 68 while mounting the outside roll 56 for lateral movement and driving it through a flexible drive shaft. Referring to FIG. 5, the upper and lower ends of the outside roll 56 may be rotatably mounted to bearing blocks 70 and 72 respectively. These bearing blocks are independently laterally slideable and pivotable within respective lateral slots 74 and 76 in the chassis 12. This allows either independent or mutual lateral movement of the ends of the roll 54 away from the roll 56. Springs 78 and 80 respectively act against the bearing blocks 70 and 72 to independently bias each end of the outside roll 56 towards the inside roll 54. To provide rotational power to the outside roll 56, a conventional universal joint drive 82 is provided from the gearing 66.

The mass of a chopper is an important factor. There is a serious problem in chopper operations due to hard objects such as scrap metal, stones, etc., entering the machine and being hit by the chopper blades. With a heavy and axially elongate chopper, the high inertia of the chopper is a serious safety hazard and also tends to increase damage to the machine from a sudden stoppage.

Considering now the choppers 24 and 26, it may be seen that they preferably comprise two separate and spaced apart but substantially identical reel-type chopper-throwers. Both choppers are preferably mounted coaxially on the same longitudinally extending driven shaft 84, each immediately behind a feed roll pair. The shaft 84 extends from the power take-off drive 46 at the inside of the forage harvester to the outside of the forage harvester, i.e. substantially the full width of the forage harvester 10, and is preferably provided with overrunning clutch connections to the choppers. However, it may be seen that the combined width of the two choppers 24 and 26 is substantially less than the width of the forage harvester. In fact, the axial width of each chopper is preferably less than its diameter. The axial width of each chopper is preferably less than the lateral extent or width of the feed roll pair.

The two choppers 24 and 26 together weigh significantly less than a single chopper of the same effective lateral extent. Further, the choppers 24 and 26 are so located that most of the mass thereof is placed near the ends of the shaft 84 and none is at the center of said shaft, thus providing improved balance and rigidity.

Considering the one chopper 24, since the two are preferably substantially identical, it may have at least two radial blade supporting members 86 providing fastening means for holding a spaced plurality of chopper blades 88. The chopper blades 88 are preferably evenly concentrically aligned to define a generally cylindrical surface of revolution by the outer or cutting edges thereof. They may be circumferentially staggered with respect to the blades of the chopper 26 to reduce vibration. The chopper blades 88 are adapted to shear crop against a shear blade 90 which is fixed to the chassis 12 at the surface of revolution of the chopper blades 88. The shear blade 90 is preferably spaced from the feed roll pair 20 generally level with the upper end of the feed roll pair.

The chopper 24 is preferably although not necessarily upcutting, i.e. the shear blade 90 is located at the forward side of the surface of revolution of the chopper and the choppers are rotated so that at this forward side thereof the chopper blades 88 are moving upwardly toward the shear blade 90. The chopper blades 88 thus serve in the discharge of the crop after it is sheared by throwing the crop upwardly.

The chopper 24 provides both shear cutting and impact cutting due to the cooperative relationship with the feed rolls. As the blades 98 sweep upwardly closely past the rear of the feed rolls, they strike the vertical row of crop extending through and held between the feed rolls and impactly cut the crop. In the process, the crop is moved upwardly by the blade impacts. The crop which is not impactly cut is cut at the shear blade 90.

The chopper 24 is preferably substantially completely enclosed by a chopper housing 92 substantially closely spaced from the surface of revolution of the chopper. One end of the chopper housing 92 is preferably open adjacent the shaft 84 to admit air into the chopper housing. Rotation of the chopper blades 88 within the chopper housing 92 provides a centrifugal blower effect for the discharge of the crop after comminution. A large opening 94 is provided in the upper surface of the chopper housing 92, which opening 94 overlies the chopper and communicates with a discharge housing 96. The discharge housing 96 is an upwardly converging tubular member which deflects and conducts the comminuted crop therein to its open upper end where the crop is discharged. Preferably the only opening in the chopper housing 92 other than the opening 94 is a vertically elongate aperture 98 having a width less than that of the feed roll pair 20 and a length coextensive therewith. The aperture 98 allows the introduction of the crop from the feed roll pair into the chopper housing. A plate portion 100 of the chassis 12 extends between the upper end of the feed roll pair and the shear blade 90 to support the shear blade and prevent the upward escape of any crop without comminution.

Preferably the lower ends of the feed roll pair 20 are located substantially below the axis of rotation of the corresponding chopper 24, and the upper ends of the feed roll pair are substantially above the axis of rotation of the chopper. Further, the lower ends of the feed rolls are closely tangential the surface of revolution of the chopper and underneath the forwardmost portion of the chopper. Thus, the space between the chopper and the fed roll pair 20 is downwardly restrictive and converging. This relationship between the feed roll pair and its corresponding chopper and the upward movement of the crop effected by the impact of the blades 88 prevents the trapping or accumulation of uncut crop in front of the chopper. Thus the feed rolls are self cleaned by the chopper.

Considering in further detail the discharge housings for the forage harvester of the invention, the discharge housing 96 shown in all but FIG. 10 combines the outputs of both the chopper 24 and the chopper 26 into a single discharge path. This automatically provides complete mixing of the crop from both choppers. When, however, it is desired to separately harvest the crop from each chopper, as from alternate row crops, the discharge housing 96 may be simply removed and replaced with a dual discharge housing 102 as shown in FIG. 10. The dual discharge housing 102 provides complete separation of the incrementally harvested crop from the two chopper housings by maintaining the crop in two separate discharge paths.

A further feature of the forage harvester of the invention is that it is readily specifically adapted to harvest standing row crop. As may be seen in FIGS. 8 and 9, both auger drums 16 and 18 and their drive means and the bottom wall or pan 32 may be easily removed from the chassis 12, and in their place a row crop attachment 104 may be attached to the front of the chassis 12, and the sickle mower 34 may be unfastened and reattached at a new position directly under the lower ends of the feed rolls. The drive shaft for the sickle mower may be telescopic to allow for this repositioning. The entire remainder of the forage harvester 10 is the same and performs in exactly the same manner as with the auger drums atttached. The exemplary row crop attachment 104 comprises a pair of row crop deflection means of a generally conventional configuration. The row crop attachment 104 may include a forwardly projecting center divider 106 and opposing pairs of inwardly and downwardly converging side wall deflectors 108 and 110. Each deflector pair 108 or 110 is in alignment with one of the feed roll pairs 20 or 22 and deflects and transversely condenses row crop directly into the feed roll pair.

A further advantage of the arrangement of the invention is that the above described forward tilt of the feed roll pair allows the plant to be held by the feed rolls while its base is cut. The feed rolls pull the crop upwardly and rearwardy away from the sickle mower after cutting to prevent the stalks from being dragged over or recut by the mower. This is assisted by the upward crop movement effect of the choppers previously described. The forwardly projecting scraper and shield 60 assists by prostrating the top of the plant forwardly.

While the forage harvester 10 has been described herein as having a sickle mower 34, it will be appreciated that the above described advantages of the forage harvester 10 are equally applicable to the harvesting of windrow crop wherein the sickle mower 34 would not be necessary. Minor additions or modifications within the purview of those skilled in the art to the auger drums could of course be provided to improve the pick up of windrow crop.

The operation of the forage harvester 10 will be apparent from the above description of the operation of its various components. It may be conventionally moved over the field to be harvested by a traction vehicle which may also provide power to the power take-off drive 46. As the harvester advances, the crop engaged by the sickle mower 34 is cut. The crop is separated and transversely condensed in separate increments toward the terminus of the separate condensing means and there passed through a vertically elongate aperture at each side of the vehicle. There each feed roll pair grabs and pulls the crop through between the rolls and moves it rearwardly into its respective narrow and low mass chopper 24 or 26. The cutting chopper blades then shear the crop by impact or against the shear blade 90 and propel it out through the discharge housing which may be either common or separate. If it is desired to mix together the two different crops planted in alternate row configuration, the common discharge housing 96 may be employed. Where, however, it is desired to harvest each row separately, the dual discharge housing 102 may be employed.

It will be appreciated that the forage harvester 10 is suitable for harvesting a wide variety of crops, both row and standing forage and including even such crops as sudex. The separate incremental handling of separate swaths of crop in separate choppers is particularly advantageous for overabundant or excessively dense crop as compared to attempting to handle the crop gathered from the full lateral width of a harvester in a signle chopper.

It may be seen that the forage harvester unit as described herein provides an improved structure, operation, safety and utility. It will be appreciated that the foregoing disclosure relates to only a preferred embodiment of the invention and that numerous modifications or alterations may be made therein without departing from the true spirit and scope of the invention as set forth in the appended claims.

What is claimed is:

1. A forage harvester having a forward side and comprising, a support, cutter means on said support for severing growing crops from their roots, an in-line pair of auger drums mounted to said support for common horizontal rotation, said pair of auger drums being substantially adjacent and coextensive in transverse length with said cutter means, each of said auger drums having opposing pitch flights transversely converging centrally thereon for incremental transverse crop condensing, and generally parallel and closely spaced pair of elongate feed rolls positioned immediately behind and centrally of each said auger drum and having upper and lower ends, said feed rolls being rotatably driven on generally vertical and forwardly tilted axes of rotation with their said upper ends closely adjacent said auger drums, and a spaced pair of reel-type chopper-throwers on a common generally horizontal axis, each said chopper-thrower being positioned closely adjacent said lower ends of one of said pair of feed rolls, said feed rolls having their said lower ends below said horizontal axis of said chopper-throwers.

2. A forage harvester comprising transversely elongated means for cutting and gathering forage crops, a plurality of rotary blower choppers spaced lengthwise of said cutting and gathering means, means for feeding cut crops from said gathering means to said choppers, a common housing enclosing each of said choppers and providing a single outlet for all of said choppers, each chopper positioned in the housing to chop and blow crops and air through said housing and to augment by induction the outflow of crops from the other of said choppers.

3. The invention according to claim 2 and said feeding means comprising a pair of opposing rollers, said rollers having sides facing the cutting and gathering means, means rotating said rollers in a direction moving said rollers at said sides toward each other to provide an intake nip, said choppers being mounted for rotation on an axis transverse to the axis of said rollers and oriented to sweep lengthwise of the rollers.

4. The invention according to claim 3 and said rollers extending diagonally vertically and each chopper having peripheral blades sweeping tangentially to the rollers.

5. The invention according to claim 2 and said choppers having operational axes extending generally parallel with the cutting and gathering means.

6. The invention according to claim 1 and said gathering and cutting means comprising a plurality of dividers providing plant passageways in alignment with each choppers.

7. The invention according to claim 1 and said crop gathering means comprising an auger having flights arranged to gather crops after being cut into respective choppers.

8. The invention according to claim 1 and said gathering means comprising a removably mounted auger means extending transversely of the harvester and gathering dividers optionally mountable on the harvester upon removal of the auger means.

9. The invention according to claim 1 and said housing convering in the nature of a funnel into a common duct.

10. The invention according to claim 1 and said feeding means comprising a pair of rollers disposed ahead of each chopper and mounted on upwardly and forwardly inclined axes in close proximity and direct feeding relation to the associated chopper.

11. A forage harvester comprising a support structure, mowing means on said structure, a horizontal auger rotatably mounted on said structure in receiving relation to the crops cut by the mowing means, for condensing the crops and having means for discharging the crops rearwardly in a predetermined region, a pair of feed rollers on the stucture behind the auger in direct receiving relation to said discharge region, said rollers journaled on axes inclined toward the auger, and said rollers having upper ends tangential to the auger whereby the entire lengths of the rollers form with the backside of the auger a downwardly widening area for accommodating the crops from said discharge means, said auger rotatable upwardly on its back side facing the rollers and with said discharging means forcing the material upwardly and rearwardly along the entire lengths of said rollers, and a generally horizontal chopper having an area of tangency with the lower ends of said rollers and having a peripheral path diverging away from the upper ends of the rollers and providing an upwardly widening space for accommodating the crops being discharged by the rollers in an upward rearward trajectory.

References Cited

UNITED STATES PATENTS

| 2,348,634 | 5/1944 | McEachern | 56—16 |
| 2,529,358 | 11/1950 | Slater | 56—505 |
| 2,657,513 | 11/1953 | Martin | 56—16 |
| 2,972,848 | 2/1961 | McKee | 56—16 |
| 3,139,717 | 7/1964 | Fischer | 56—23 |

ANTONIO F. GUIDA, Primary Examiner

U.S. Cl. X.R.

56—2, 16